United States Patent
Wiener et al.

[19]

[11] Patent Number: 5,769,714
[45] Date of Patent: Jun. 23, 1998

[54] METHODS AND APPARATUS FOR PLAYING BASEBALL GAMBLING GAMES

[76] Inventors: Herbert Wiener, 3220 Netherland Ave., Apt. 2F, Bronx, N.Y. 10463; Michael Steven Budlow, 3220 Netherland Ave., Apt. 2F, Riverdale, N.Y. 10463; Robert D'Alessio, 3 - Cloud Dr., Montville, N.J. 07045

[21] Appl. No.: 667,984

[22] Filed: Jun. 19, 1996

[51] Int. Cl.$^6$ .................................................... A63F 9/22
[52] U.S. Cl. .................... 463/3; 273/108.3; 273/461; 273/317.6; 463/25; 463/26; 463/40
[58] Field of Search ............................... 463/1, 3, 25, 26, 463/27, 28, 30, 31, 36, 37, 40; 364/410, 411, 412; 273/108.1, 108.3, 108.31, 108.32, 138.2, 277, 317.6, 461

[56] References Cited

U.S. PATENT DOCUMENTS

| | | | |
|---|---|---|---|
| 1,802,521 | 4/1931 | Miner | 273/108.31 |
| 3,790,170 | 2/1974 | Alexander, Jr. | 273/277 |
| 4,055,342 | 10/1977 | Matsumoto | 273/108.32 |
| 4,240,632 | 12/1980 | Watanabe | 273/277 |
| 5,026,058 | 6/1991 | Bromley | 463/3 |
| 5,067,079 | 11/1991 | Smith, III et al. | 463/3 |
| 5,435,554 | 7/1995 | Lipson | 463/3 |

*Primary Examiner*—Jessica Harrison
*Assistant Examiner*—Mark A. Sager

[57] ABSTRACT

The present invention discloses casino baseball gambling games played on electronic video gaming devices including a microprocessor, computer memory chips, programming software or firmware, a video display, control input buttons, and a coin acceptor. In a first embodiment of the invention, multiple players make wagers and compete against each other to win a pot formed by player wagers by scoring the greatest amount of runs in an allotted number of innings of play. Player scores are determined by various simulated "at bat" events such as singles, doubles, strike outs, steals, bunts, and home runs, which occur under program control based upon probabilities for the actual "at bat" events derived from major league baseball statistics. Preferably, players are afforded an option at an intermediate step in game play, after a first one-half inning, to either drop out and forfeit their initial wager, or to continue play by placing a second wager. In a second embodiment, an electronic video slot type machine intended for play by a single player, or by multiple players taking turns in succession, operates under program control to display baseball "at bat" events, associated odds, and separate wagering options on first and second portions of a video display. The second portion of the video display provides an optional "home run" attempt and associated wager which does not affect play of the game on the first display portion.

16 Claims, 8 Drawing Sheets

| First inning, Player No.1 is up at bat | | |
|---|---|---|
| Player No.1 has no runs | Player No. 2 has no runs | Player No. 3 has no runs |
| Player No.1<br><br>Outs: 0<br>Runs: 0<br>In:  $5<br><br>◇<br><br>nobody on, nobody out | Player No. 2<br><br>Outs: 0<br>Runs: 0<br>In:  $5<br><br>◇<br><br>nobody on, nobody out | Player No. 3<br><br>Outs: 0<br>Runs: 0<br>In:  $5<br><br>◇<br><br>nobody on, nobody out |
| you put in $5<br>you are up at bat | you put in $5 | you put in $5 |

*Fig. 1*

The pot is $15.00, the ante is $5.00, Bet or Fold?

| Player No.1 has 1 run | Player No. 2 has no runs | Player No. 3 has 2 runs |
|---|---|---|
| Player No.1<br><br>Outs: 3<br>Runs: 1<br>In: $5 | Player No. 2<br><br>Outs: 3<br>Runs: 0<br>In: $5 | Player No. 3<br><br>Outs: 3<br>Runs: 2<br>In: $5 |
| in the dugout, three outs | in the dugout, three outs | in the dugout, three outs |
| you put in $5<br>you are up at bat<br>ground out 1b<br>single rf<br>ground out p<br>single rf<br>you score 1 run<br>single cf<br>ground out p-1b | you put in $5<br>you are up at bat<br>foul out c<br>ground out 1b<br>strike out | you put in $5<br>you are up at bat<br>foul out c<br>walk<br>pop out 2b<br>walk<br>triple lf<br>you score 2 runs<br>flyout cf<br>player stays |

```
┌─────────────────────────────────────────────────────────────────────┐
│                                                         12           │
│                                                                      │
│  Second inning, Player No.1 is up at bat              18             │
│              14              16                                      │
│  ├──────────────────┬──────────────────┬──────────────────┤          │
│  │Player No.1 has 1 run│Player No. 2 has no runs│Player No. 3 has 2 runs│
│20├──────────────────┼──────────────────┼──────────────────┤          │
│  │Player No.1       │Player No. 2      │Player No. 3      │          │
│  │Outs: 0           │Outs: 3           │Outs: 3           │          │
│  │Runs: 1           │Runs: 0           │Runs: 2           │          │
│22│In:   $10         │In:   $10         │In:   $10         │          │
│24│      ◇           │      ◇           │      ◇           │          │
│26│     ☺ 27         │                  │    ☺ ☺           │          │
│28│nobody on, nobody out│in the dugout, three outs│in the dugout, three outs│
│  ├──────────────────┼──────────────────┼──────────────────┤          │
│  │you put in $5     │you put in $5     │you put in $5     │          │
│30│you are up at bat │                  │                  │          │
│  │                  │                  │                  │          │
└─────────────────────────────────────────────────────────────────────┘
                            Fig. 3
                        10
```

| | | |
|---|---|---|
| Player No. 3 wins $30 pot. | | |
| Player No.1 has 1 run | Player No. 2 has no runs | Player No. 3 has 4 runs |
| Player No.1<br><br>Outs: 3<br>Runs: 1<br>In:   $10<br><br>◇<br><br>in the dugout, three outs | Player No. 2<br><br>Outs: 3<br>Runs: 0<br>In:   $10<br><br>◇<br><br>in the dugout, three outs | Player No. 3<br><br>Outs: 3<br>Runs: 4<br>In:   $10<br><br>◇<br><br>in the dugout, three outs |
| you put in $5<br>you are up at bat<br>ground out ss<br>single cf<br>fly out rf<br><br>[Steal] [Bunt] | you put in $5<br>you are up at bat<br>foul out c<br>ground out p<br>single cf<br>strike out | you put in $5<br>you are up at bat<br>single cf<br>home run rf<br>you score 2 runs<br>walk<br>foul out c<br>fp ss-2b<br>ground out 3b |

METHODS AND APPARATUS FOR PLAYING BASEBALL GAMBLING GAMES

BACKGROUND OF THE INVENTION

1. Field of the Invention

The present invention relates to casino gambling games, and more particularly pertains to methods and apparatus for playing baseball gambling games using electronic video "slot" machines of the type conventionally employed in casinos to enable casino patrons to play video poker.

2. Description of the Prior Art

Casinos conventionally employ electronic video gaming devices to enable casino patrons to play a gambling game known as video poker. These conventional video "slot" machines employ a microprocessor in combination with computer memory chips, appropriate programming software or firmware, a video display, control input buttons, and a coin acceptor to provide a simulation of a poker game in which video card representations "dealt" by a computer replace actual playing cards. In use, a player employs the coin acceptor and the various control input buttons to place wagers, discard, and draw additional cards, depending upon the particular rules of play reflected in the software or firmware.

The prior art also includes computer software games intended for amusement which simulate the play of baseball, football, basketball, and golf games on the video display of a personal computer by producing video representations of players under computer program control.

SUMMARY OF THE INVENTION

The present invention discloses casino baseball gambling games played on electronic video gaming devices including a microprocessor, computer memory chips, programming software or firmware, a video display, control input buttons, and a coin acceptor. In a first embodiment of the invention, multiple players make wagers and compete against each other to win a pot formed by player wagers by scoring the greatest amount of runs in an allotted number of innings of play. Player scores are determined by various simulated "at bat" events such as singles, doubles, strike outs, steals, bunts, etc., which occur under program control based upon probabilities for the actual "at bat" events derived from major league baseball statistics. Preferably, players are afforded an option at an intermediate step in game play, after a first "at bat", to either drop out and forfeit their initial wager, or to continue play by placing a second wager. In a second embodiment, an electronic video slot type machine intended for play by a single player, or by multiple players in succession, operates under program control to display baseball "at bat" events, associated odds, and separate wagering options on first and second portions of a video display. In use, a player places a first wager and pushes a start button to simulate baseball "at bat" events for a first batter under program control on the first portion of the video display. After determination of the results for the first batter, the player is afforded an option to attempt a "home run" by placing an additional optional wager associated with the second portion of the video display. Results of the wagers and "home run" attempts associated with the second portion of the video display do not affect in any way play of the game on the first portion of the video display.

BRIEF DESCRIPTION OF THE DRAWINGS

FIG. 1 is a diagrammatic representation of a video display of a baseball gambling game according to a first embodiment of the invention illustrating example game conditions at the beginning of a first inning of play.

FIG. 2 is a diagrammatic representation of a video display of a baseball gambling game according to a first embodiment of the invention illustrating example game conditions at the end of a first inning of play.

FIG. 3 is a diagrammatic representation of a video display of a baseball gambling game according to a first embodiment of the invention illustrating example game conditions at the beginning of a second inning of play.

FIG. 4 is a diagrammatic representation of a video display of a baseball gambling game according to a first embodiment o f the invention illustrating example game conditions at the end of a second inning of play.

DETAILED DESCRIPTION OF THE PREFERRED EMBODIMENT(S)

Figure 5:
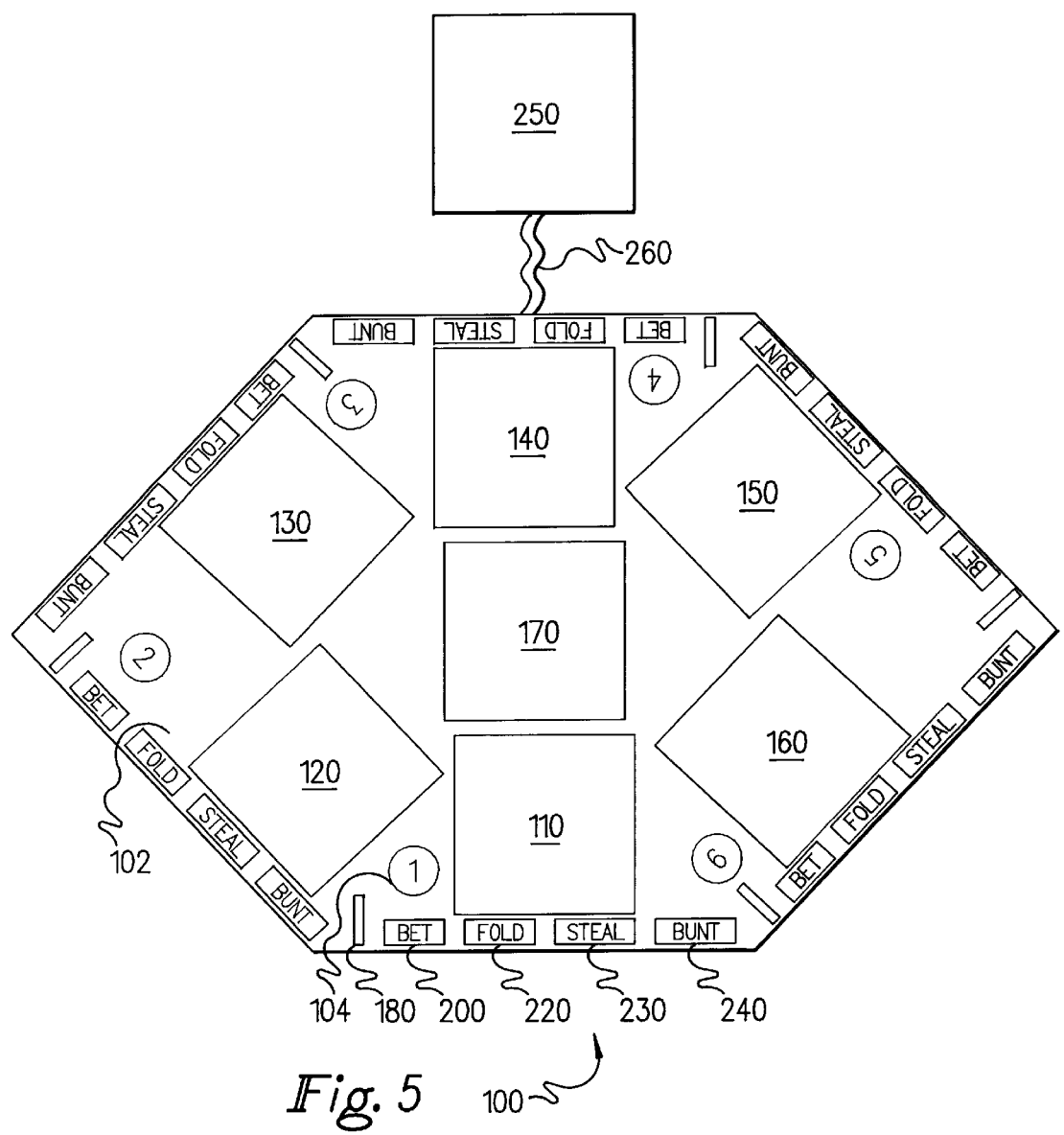
FIG. 5 is a diagrammatic illustration of a casino gaming table including a plurality of video displays, coin acceptors, and control input buttons to enable a plurality of players to simultaneously play a baseball gambling game according to a first embodiment of the invention.

Referring now to the drawings, wherein like reference numerals designate corresponding structure throughout the views, and referring in particular to FIGS. 1–6, methods and apparatus for playing a baseball gambling game according to an example first preferred embodiment of the invention will now be described.

FIGS. 1 through 4 illustrate diagrammatic representations of a video display of an electronic gaming device of the type including a microprocessor in combination with computer memory chips, appropriate programming software or firmware, a video display, control input buttons, and a coin or token acceptor. The construction and manner of programming of these conventional electronic gaming devices is generally well-known, and devices of this type are manufactured by Bally's and International Gaming Technology. Pursuant to the present invention, generally conventional electronic gaming devices of this type are provided with suitable computer programming software or so-called firmware comprising program control instructions stored on a ROM (read only memory) type chip.

With reference to FIGS. 1 through 4, the program control instructions in conjunction with the hardware comprising the electronic gaming device are operative to produce a display on the video display portion of the electronic gaming device 10 indicating game conditions of the baseball gambling game according to the present invention.

While the particular graphical display format may take a wide variety of forms without departing from the scope of the present invention, the display preferably includes a game status zone or region 12 for the display of indicia 13 indicating the inning of play and the player number currently at bat. The video display 10 preferably also includes columnar regions 14, 16, and 18 for the display of text and/or graphical indicia indicating wager, winnings, and scoring information for a plurality of different players. Alternatively, the game may be designed as a single player game, in which case the display 10 will display information only pertaining to a single player. In the embodiment illustrated in FIGS. 1 through 4, three different players, respectively designated with the numbers 1, 2, and 3, are participating in the game. A horizontally extending row 20 contains indicia designating the current game scores of each of the three players. A second region 22 in each of the three columns 14, 16, and 18 bears indicia indicating the number of outs, runs, and wagers placed by each of the three players. An additional indicia region 24 of each of the columns 14, 16, and 18 disposed immediately below the regions 22 preferably contains a graphical representation 26 of a baseball diamond. As shown, for example in FIG. 2, the region 26 preferably also possesses the capability for displaying graphical representations of baseball players 27 indicating men on base and runs scored. If desired, the game may include complex graphical representations of an entire baseball park, fans, a dugout, and entire team in the field, etc., in order to provide more realism and enhanced entertainment to game players.

An additional region 28 disposed below the graphical representation region 26 contains status information for each of the three players indicating the number of men on base and the number of outs in a particular turn at bat. A lower region 30 of each of the three columns 14, 16, and 18 contains an event listing which contains a list in sequential order of wagers placed and at bat events of a particular player associated with a turn at bat.

FIGS. 1. through 4 sequentially illustrate successive stages in an example game pursuant to the first embodiment of the present invention, in which three players participate against each other. With reference to FIG. 1, each of the three players has placed an initial $5.00 wager to form a pot. In connection with receiving the wagers, a suitable token or coin acceptor of the type employed in video poker games and slot machines may be provided. In FIG. 1, Player No. 1 is up at bat, after placement of the initial wagers, at the initiation of the first inning of play.

FIG. 2 illustrates the indicia displayed on the computer video display 10 after an example first one-half inning of play. The game status depicted in FIG. 2 resulted from the following events. Player No. 1 placed an initial $5.00 wager, and took an initial turn at bat. The events associated with the Player No. 1 turn at bat are illustrated in column 14 in the horizontal row region 30. The listed at bat events are preferably generated by a microprocessor under suitable program control, preferably in accordance with the corresponding statistics for at bat events derived from the actual statistics associated with the play of major league baseball. As can be readily appreciated, the various at-bat events may be illustrated simply, or in great detail in the graphical representation region 26. Additionally, due to the computer program implementation and control of the game steps, the various at bat events are generated with extreme rapidity so as to create an exciting and fast paced game. In the initial turn at bat, Player No. 1, initially grounded out to first base, hit a single to right field, grounded out to the pitcher, singled to right field, resulting in the score of one run. Player No. 1 then singled to center field and grounded out to the pitcher, who threw the ball to the first baseman, resulting in the third out. As a result of the first at bat, the Player No. 1 scored one run.

Either simultaneously with the at bat events generated for Player No. 1, or in succession thereafter, the microprocessor under program control instructions also generated at bat events for Player No. 2 displayed in region 30 of column 16. Player No. 2 fouled out to center field, then grounded out to first base, and then struck out, resulting in no runs scored and three outs to end the turn at bat.

In a similar manner, either simultaneous with, or sequentially after the at bat one-half innings simulated for Player No. 1 and Player No. 2, the microprocessor under program control instructions generated at bat events for Player No. 3 listed in the horizontal region 30 of column number 18. Player No. 3 initially fouled out to center field, walked, popped out to second base, walked, tripled to left field, resulting in two runs scored. Player No. 3 then hit a fly out to center field for the third out, leaving a man stranded on base. After the conclusion of the first half-inning of play, Player No. 3 had three runs graphically represented in the region 26 of column 18. Player No. 2 had no runs, and Player No. 1 had a single run also graphically represented by the human figure indicia 27 appearing at the home base portion of the graphical representation of a baseball diamond in the region 26 of column 14.

After completion of the first one-half inning of play, indicia in the region 12 of the video display 10 indicates the amount of the pot at $15.00, and offers each of the three players an opportunity to either bet to continue play of the game, or to forfeit or surrender the initial $5.00 wager and drop out of the game.

At the beginning of the next stage of play at the beginning of the second one-half inning, the video display 10 illustrates game conditions as shown in Figure No. 3. Each of the three players has opted to place the second $5.00 wager to continue play, as shown in the horizontal row region 22 indicating that each player has now placed total wagers in the amount of $10.00. Player No. 1 is up at bat, and the game stands in a condition prior to the computer generation of at bat events to determine player scoring.

FIG. 4 illustrates game conditions after the computer generated simulation of at bat events for each of the three players, with the example result indicating that Player No. 3 scored a total of four runs, Player No. 2 scored zero runs, and Player No. 1 scored a single run. As a result, Player No. 3 has the highest total of runs, and wins the accumulated $30.00 pot.

During the course of any particular at bat, the game may, under appropriate program control instructions, provide the players with options to steal, or options to bunt, when appropriate game conditions arise as the result of previously computer generated at bat events. For example, in the event that a player hits a single and has a man on base, the player may be afforded an option to steal a base by the display of indicia 31. Alternatively, in particular appropriate game conditions, a player may be afforded an opportunity to attempt a bunt, by the display of indicia 32. A Player may opt to attempt to steal or bunt by manipulation of appropriate game control input buttons. Alternatively, the video display 10 may include touch screen technology such that a player may make control inputs by merely touching designated portions of the video display screen.

In a preferred aspect of the invention, the at bat events, such as singles, doubles, triples, walks, strike-outs, etc., as well as the results of steal and bunt attempts, are derived under suitable computer program control instructions stored in firmware which have been derived from the results of the statistics associated with the actual play of major league baseball. In accordance with the preferred embodiment, the actual at bat events of a particular swing by any player are derived by weighted probabilities determined with reference to a probabilities database, correlated with the number of outs, and men on base dependent upon the game condition of a particular player. Optionally, at bat events may also be weighted to reflect variations in major league baseball statistics corresponding to the different current runs scored conditions of each player.

Table No. 1 below reflects the preferred odds of scoring one, two, and three runs in accordance with a preferred embodiment of the present invention.

TABLE NO. 1

| Runs Scored | Odds |
| --- | --- |
| One Run | 12 to 5 against |
| Two Runs | 4 to 1 against |
| Three Runs | 6 to 1 against |

Table No. 2 provides information respecting game status situations in which steal or bunt options are preferably provided to a player.

TABLE NO. 2

| Successful Bunt | 70% for the player |
| --- | --- |
| Successful Steal | 60% for the player |

As shown in FIG. 5, a gaming table 100 for use in playing the baseball game according to the first embodiment of the invention described previously in connection with FIGS. 1–4, includes a plurality of video displays 110, 120, 130, 140, and 160, disposed, respectively, at player locations 1, 2, 3, 4, 5, 6 spaced evenly about the periphery of a hexagonal table. Each of the six player locations includes a coin acceptor 180, a BET input control button 200, a FOLD input control buttor. 220, a STEAL control input button 230, and a BUNT control input button 240. In addition to the six individual video displays 110, 120, 130, 140, 150, and 160 which contain game and player status information pertaining to each of the individual players, the table 100 also preferably includes a central video display 170, disposed so as to be easily viewed by each of the six players at the table 100, which contains indicia representative of the amount wagered and the scoring summary information with respect to each of the game players. The individual video displays, as well as the central video display 170, may be disposed flush with the surface of a table 100, or may alternatively be suitably inclined to enhance the viewing thereof.

During the play of the baseball gambling game according to the first embodiment of the invention on the gaming table 100, a computer 250 connected in a network fashion to each of the six individual video displays as well as the central video display 170, operates under appropriate computer program control instructions, and in accordance with player wager and control inputs, to preferably simultaneously simulate at bat events and scoring for each of the six game players. Thus, the gaming table 100 illustrated in FIG. 5 allows a plurality of players to compete against one another in a fast paced and exciting gambling game based upon the popular national sport of baseball. To enhance game appeal and player excitement, the game may also include speakers, sound cards, and appropriate program control instructions for generating appropriate sounds depending upon various game conditions or at bat events. For example, when a player hits a home run, the computer 250 may generate the roar of a crowd and the voice of an announcer indicating the home run.

Figure 6:
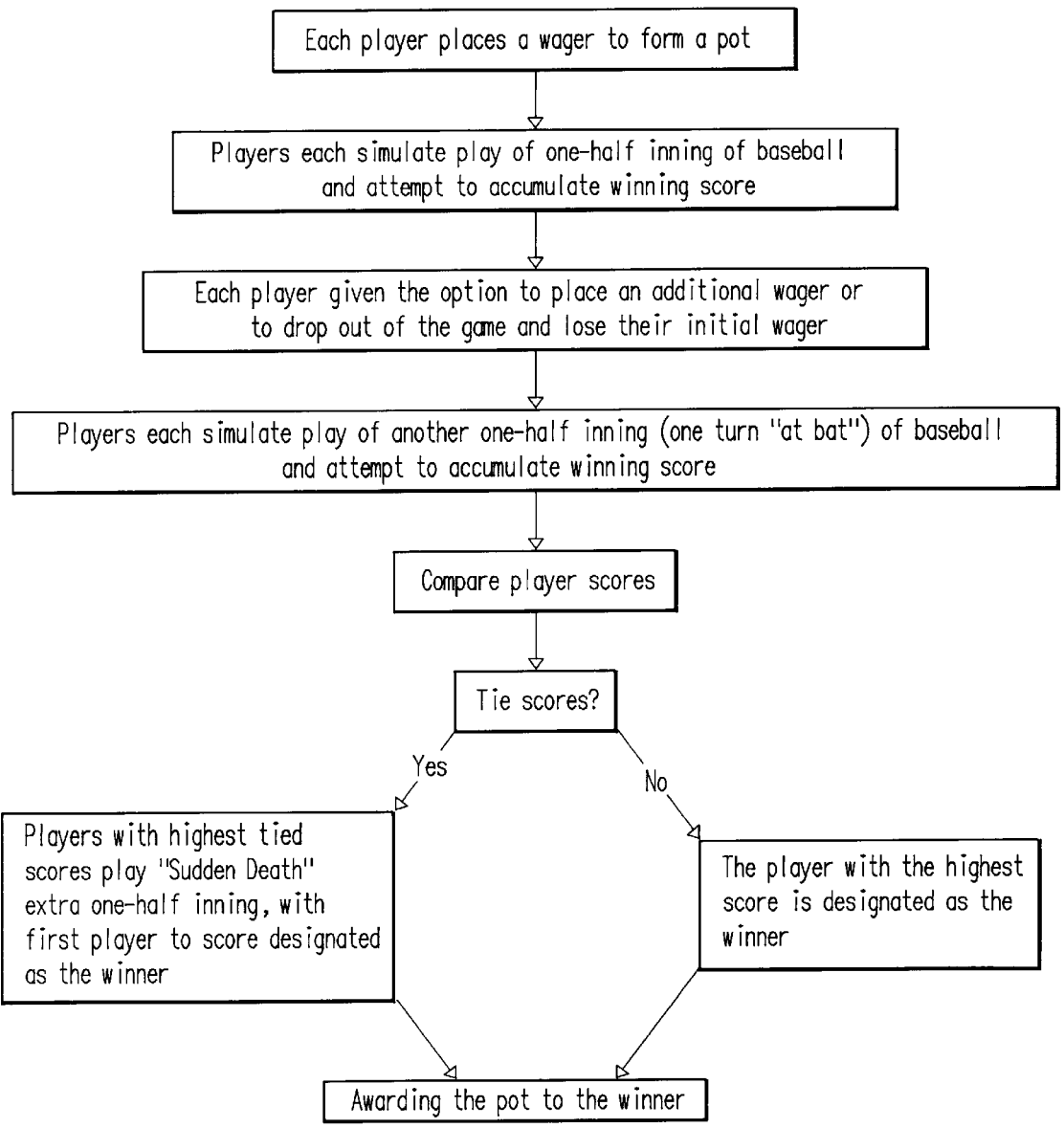
FIG. 6 is a flow chart illustrating the steps in the method of playing a baseball gambling game according to a first embodiment of the invention.

FIG. 6 depicts a flow chart illustrating the method of play of the baseball gambling game according to the first embodiment of the present invention. Each player initially places a wager to form a pot. In the next step, the players, under computer program control, simulate, according to statistics preferably derived from actual major league baseball statistics, play of one-half inning, or one turn at bat, of baseball and attempt to accumulate a winning score by scoring the greatest number of runs. After completion of the first turn at bat, each player is given the option to place an additional wager, or to drop out of the game and forfeit or surrender their initial wager. Pursuant to computer program control, the players opting to place the additional wager then each simulate play of another one-half inning, or turn at bat, of baseball, and attempt to accumulate additional scores or runs. Play may continue in this manner for any desired number of turns at bat, at which time the computer, under program control instructions, automatically compares the player scores. In the event of a tie score between two or more players, the players having the highest tied scores play a sudden death extra one-half inning or turn at bat, with the first player to score designated as the winning player. In the event of a tie, the contestants only have to place an ante wager for three rounds after the tie is established. If the tie persists after three rounds, no further ante wagers are required. At the conclusion at each round of play, the player having the highest score is designated as the winning player and awarded the pot.

Figure 7:
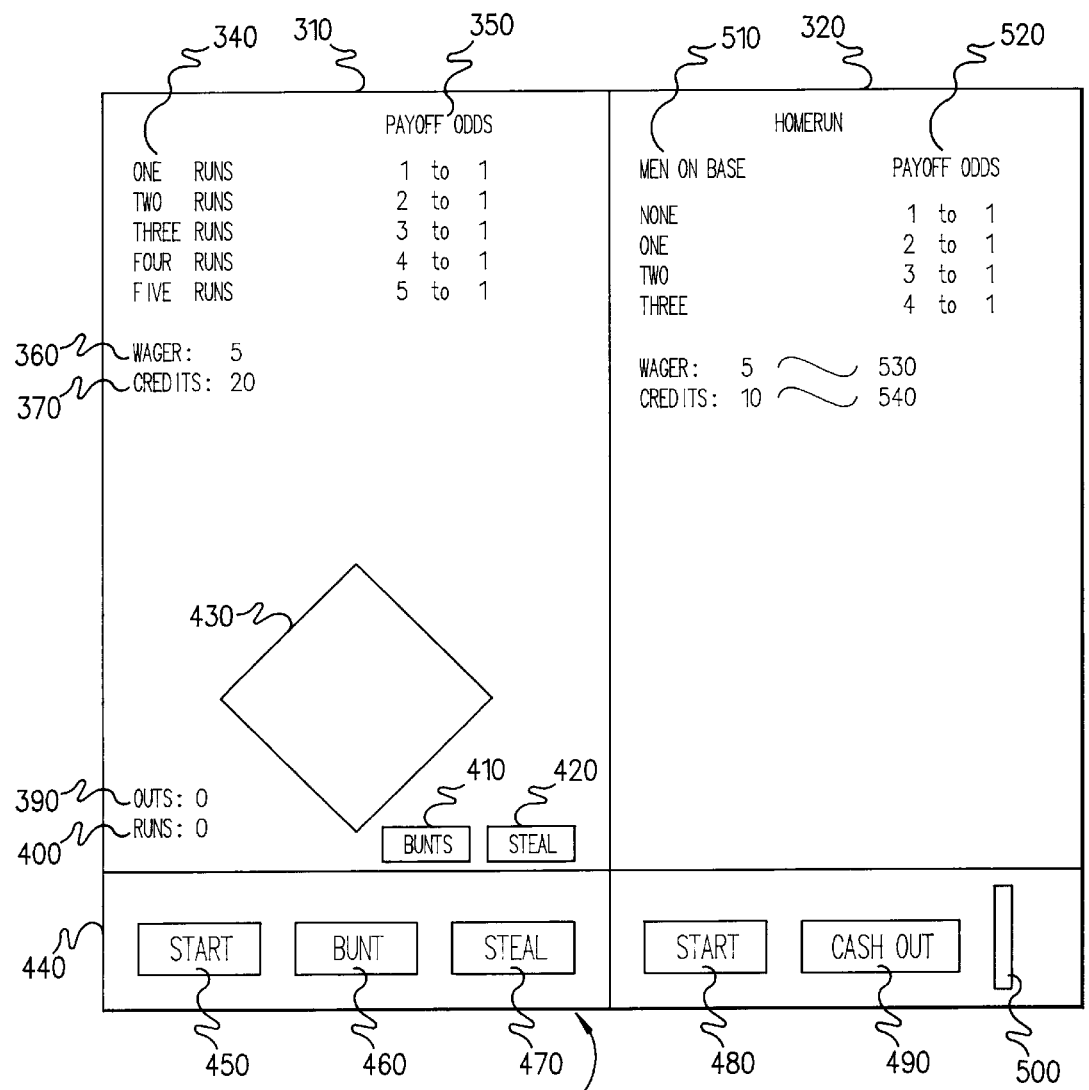
FIG. 7 is a diagrammatic elevational view of the face of an electronic video gaming device for playing a baseball gambling game according to a second preferred embodiment of the invention.
Figure 8:
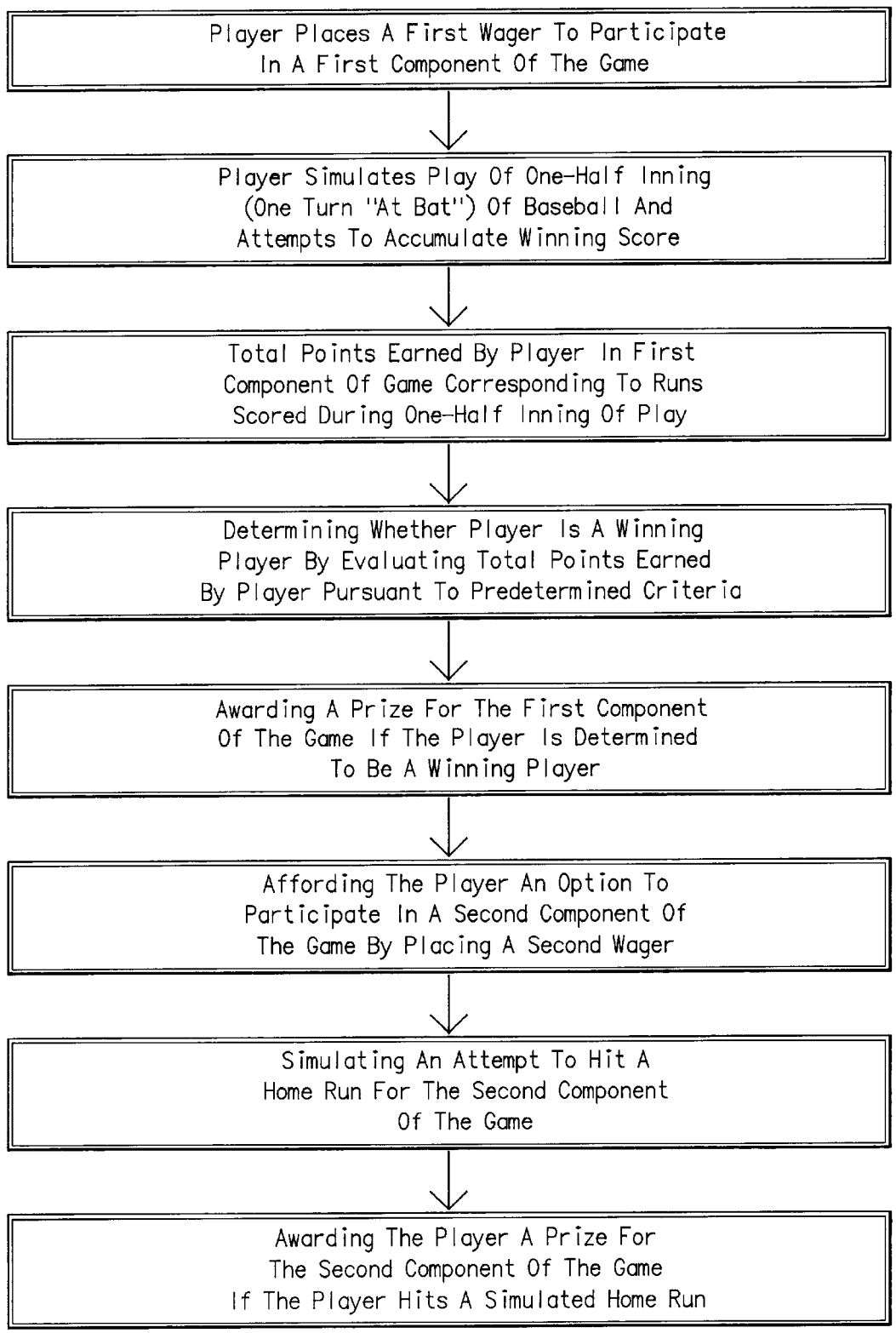
FIG. 8 is a flow chart illustrating the steps in the method of playing a baseball gambling game according to a first embodiment of the invention.

According to a second preferred embodiment of the present invention illustrated in FIGS. 7 and 8, an electronic video type gaming device of the type employed in conventional video slot machines and video poker machines and including a microprocessor, computer memory chips, a coin acceptor, a video display, and appropriate computer program control instructions preferably embedded in firmware on a ROM, provides a single player stand alone electronic casino gambling device for play of a simulated baseball gambling game.

With reference to FIG. 7, the electronic video gaming device 300 according to the second preferred embodiment of the invention includes a video display having regions 310 on the left, and 320 on the right, which, under operation of computer program control instructions, display indicia corresponding to first and second components of a baseball gambling game.

The left hand portion 310 of the video display screen includes a columnar region 340 indicating the number of runs scored by a player, with a second columnar region 350 indicating the corresponding payoff odds. The particular payoff odds shown in column 350 are for example purposes only, and the actual odds associated with the game may vary within the scope of the present invention. The first video display portion 310 includes indicia 360 designating the current number of coins wagered by a player, which preferably ranges from one to five permissible tokens wagered. The first region 310 may also include indicia 370 representative of the accumulated number of token credits currently held by a player. Additional indicia 390 and 400 on the first video display portion 310 designates the current game status conditions, and in particular, indicates the number of outs, and the number of runs scored. Additional indicia regions 410 and 420 are selectively operable, under computer program control instructions, to display a BUNT option 410, and a STEAL option 420, in appropriate game conditions. For example, the player may be afforded a STEAL option after having previously hit a single with a man on first base. The left hand or first portion 310 of the video display also preferably includes a graphical representation 430 of a baseball diamond, including a particular player then at bat, as well as a representation of the nine members of the opposing team in the field. Preferably, the graphical representation 430 realistically depicts the players, a player swinging the bat, as well as the movement of the ball and players dependent upon realistic occurrences of at bat events. To further enhance player excitement and the entertainment value of the game, the gaming device 300 may include suitable speakers and sound cards for producing realistic game sounds, such as crowd cheering, and the crack of the bat when a player makes a hit.

A control panel portion 440 of the electronic video gaming device 300 includes a START button 450 for the first component of the game designated on the left hand portion 310 of the video display, BUNT control input button 460 for use in accepting a BUNT option, and a STEAL control input button 470 for use in accepting a STEAL option. A right hand portion of the control panel 440 includes a START button 480 for use in connection with the second component of the game designated on the right hand portion 320 of the video display, as well as a CASHOUT button 490 for use by a player in obtaining a payout in coins or tokens corresponding to the value of the accumulated credits. The device 300 also includes a conventional coin acceptor 500 for player use in depositing coins or tokens in order to place wagers associated with the game and to accumulate credits for future wagers.

In the manner of play of the game, a player first places a wager from one to five coins or tokens in connection with the first component of the game indicated on the left hand screen portion 310, and then presses the start button 450 to initiate play. The game then simulates a first batter's at bat result according to computer program control instructions, graphically displays the selected at bat event on the graphical display 430, and indicates the results by appropriate display of indicia in regions 360, 370, 380, 390, and 400.

After the first batter's result is determined, preferably pursuant to probabilities derived from statistics resulting in a payout for the device in the range of 90 to 95% of coin in, the right hand portion of the video display 320 preferably flashes the appropriate MEN ON BASE indicia, either NONE, ONE, TWO, or THREE, depending upon the first batter's result on the first component of the game depicted on the first portion 310 of the video display. The player then has the option to again bet from one to five coins or tokens, and receives a payoff amount according to the corresponding payoff odds indicated in the column 520. According to a currently most preferred version of the game, the MEN ON BASE indicia for the right hand portion of the video display 320 may flash at any time a player scores one, two, or three runs with a single push of the start button 450 for the first component of the game. By providing the option to participate in the second component of the game, after the scoring of a run for the first component of the game, rather than after the third out for the first component, the game provides a greater incentive for a player to participate in the second component of the game. It should be appreciated that the actual payoff odds may vary substantially from the example payoff odds illustrated in column 520 in FIG. 7. Indicia 530 and 540 designate the player's current wager, from one to five tokens, as well as the player accumulated credits. The player may optionally select to play the second component of the game associated with the video display region 320 by placing the wager from one to five coins or tokens and depressing the START button 480, or may alternatively decline the option to participate in the second component of the game by placing a wager and depressing the START button 450 for the first component of the game. In the event that the player elects to participate in the second portion of the game associated with the video display region 320, then the computer microprocessor will determine whether or not the player hits a simulated home run in the second component of the game, and provide an appropriate payoff pursuant to the odds associated with columns 510 and 520.

The gaming device 300 also preferably includes suitable speakers and sound processing card components to produce a sound associated with the player's result on the second component of the game, for example, the game may produce the sound "GOING, GOING, GONE", when a player successfully hits a home run. The game associated with the second component of the game permits a player to either hit a home run or not, no other scoring options are available. In contrast, the game associated with the first component of the game displayed on the video display region 310 permits a players to score by a combination of walks, singles, doubles, triples, and stolen bases, but does not permit home runs.

The success of a home run attempt in the second component of the game associated with the video display region 320 has no effect on the player's final score on the first component of the game associated with the video display region 310. If the player fails to hit a home run in the second component of the game, he is not penalized with an out in connection with the first component of the game, and the first component of the game then continues on the video display region 310. When the next batter comes up, his result is again determined under computer control instructions and indicated graphically in the display region 430, the player again has the option of placing a wager to participate in the second component of the game associated with the video display region 320. The option to participate in the home run or second component of the game associated with the video display region 320 occurs after every batter comes to the plate on the game associated with the first component of the game indicated on the video display region 310. Even if a player does not score a run in the first component of the game, the player may still have the opportunity to win in connection with the second component of the game by hitting a home run. Accordingly, the wagers and payoff amounts are separately and independently determined for each of the first and second components of the games, with the exception that the current men on base situation in the first component of the game determines the particular odds in play associated with columns 510 and 520 for the second component of the game.

FIG. 8 illustrates a flow chart of one example method of play of the baseball gambling game according to the second embodiment of the present invention previously described in connection with FIG. 7. While the embodiment of the game illustrated and described in connection with FIGS. 7 and 8 is preferably employed as a single player game, it may also permit multiple players to compete by placing in succession or through the linking of a plurality of machines.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed, and reasonable equivalents thereof.

What is claimed is:

1. A method of playing a baseball gambling game on an electronic gaming device, comprising the steps of:

affording at least one player an opportunity to place an initial wager to participate in the game;

simulating at least one turn at bat by displaying representations of at bat events of a baseball game on a video display selected under computer program control;

totalling points earned by said at least one player corresponding to runs scored during said simulated at least one turn at bat;

determining whether said at least one player is a winning player by evaluating total points earned by said at least one player pursuant to predetermined criteria; and awarding a prize to said at least one player if said player is determined to be a winning player.

2. The method of claim 1, wherein said step of simulating at least one turn at bat comprises simulating at least one-half inning of a baseball game.

3. The method of claim 1, wherein said step of simulating at least one turn at bat comprises generating at bat events under computer program control corresponding to the probability of occurrence of said at bat events derived from major league baseball statistics.

4. The method of claim 1, wherein said at bat events potentially selected under computer program control include singles, doubles, triples, home runs, walks, strikeouts, bunts, steals, double plays, sacrifice flies, and caught balls.

5. The method of claim 1, further comprising the step of, after said step of simulating said at least one turn at bat, affording said at least one player an option either to drop out of the game and surrender said initial wager, or to place an additional wager and continue game play.

6. The method of claim 5, further comprising the step of affording at least one more turn at bat to each player placing said additional wager.

7. The method of claim 1, wherein at least two players form a pot by placing said initial wagers, and said prize comprises at least a portion of said pot.

8. The method of claim 7, further comprising the step of breaking a tie in point total scores between said two players after said at least one turn at bat by simulating additional turns at bat for each player and designating the first player to score as the winning player.

9. The method of claim 1, further comprising the step of providing a plurality of electronically interlinked electronic gaming devices and affording a plurality of players an opportunity to compete against each other using said interlinked electronic gaming devices.

10. A method of playing a baseball gambling game on an electronic gaming device, comprising the steps of:

affording at least one player an opportunity to place a first wager to participate in a first component of the game;

simulating at least one turn at bat for said first component of said game by displaying representations of at bat events of a baseball game on a video display selected under computer program control;

totalling points earned by said at least one player in said first component of said game corresponding to runs scored during said simulated at least one turn at bat;

determining whether said at least one player is a winning player for said first component of said game by evaluating total points earned by said at least one player pursuant to predetermined criteria;

awarding a prize for said first component of said game to said at least one player if said player is determined to be a winning player;

affording said at least one player an option to participate in a second component of said game by placing a second wager after simulation of said at least one turn at bat for said first component of said game;

simulating at least one attempt to hit a home run under computer program control for said second component of said game; and awarding said at least one player a prize for said second component of said game if said player hits a simulated home run.

11. The method of claim 10, further comprising the step of determining the value of the prize for said second component of said game dependent on game conditions in said first component of said game.

12. An electronic gaming device for playing a baseball gambling game, comprising:

means for affording at least one player an opportunity to place an initial wager to participate in the game;

means for simulating at least one turn at bat by displaying representations of at bat events of a baseball game on a video display selected under computer program control;

means for totalling points earned by said at least one player corresponding to runs scored during said simulated at least one turn at bat;

means for determining whether said at least one player is a winning player by evaluating total points earned by said at least one player pursuant to predetermined criteria; and means for awarding a prize to said at least one player if said player is determined to be a winning player.

13. The device of claim 12, further comprising means for generating at bat events under computer program control corresponding to the probability of occurrence of said at bat events derived from major league baseball statistics.

14. The device of claim 12, further comprising a plurality of electronically interlinked electronic gaming devices and means for affording a plurality of players an opportunity to compete against each other using said interlinked electronic gaming devices.

15. An electronic gaming device for playing a baseball gambling game, comprising:

means for affording at least one player an opportunity to place a first wager to participate in a first component of the game;

means for simulating at least one turn at bat for said first component of said game by displaying representations of at bat events of a baseball game on a video display selected under computer program control;

means for totalling points earned by said at least one player in said first component of said game corresponding to runs scored during said simulated at least one turn at bat;

means for determining whether said at least one player is a winning player for said first component of said game by evaluating total points earned by said at least one player pursuant to predetermined criteria;

means for awarding a prize for said first component of said game to said at least one player if said player is determined to be a winning player;

means for affording said at least one player an option to participate in a second component of said game by placing a second wager after simulation of said at least one turn at bat for said first component of said game;

means for simulating at least one attempt to hit a home run under computer program control for said second component of said game; and means for awarding said at least one player a prize for said second component of said game if said player hits a simulated home run.

16. The device of claim 15, further comprising means for determining the value of the prize for said second component of said game dependent on game conditions in said first component of said game.

* * * * *